Sept. 22, 1970     R. SPIETH     3,529,873

BEARING-PLAY ADJUSTING DEVICE

Filed Dec. 11, 1968

RUDOLF SPIETH
    INVENTOR.

BY Jaeski & Davidson
    ATTORNEYS.

3,529,873
BEARING-PLAY ADJUSTING DEVICE
Rudolf Spieth, 42 Kennenburger Strasse,
73 Esslingen-Kennenburg, Germany
Filed Dec. 11, 1968, Ser. No. 782,923
Claims priority, application Germany, Dec. 15, 1967,
1,625,621
Int. Cl. F16c 25/00, 1/24, 3/14
U.S. Cl. 308—65        8 Claims

ABSTRACT OF THE DISCLOSURE

A journal bearing which is adjustable to different radial dimensions to vary the bearing play and which consists of a bearing bushing for supporting a shaft, which bushing is provided with axially parallel ribs on its outer peripheral surface and equally spaced from each other, and adjusting bushing having a meander-shaped longitudinal section surrounding the bearing bushing and inserted into an axial bore in a bearing housing, and screws extending longitudinally through the adjusting bushing for compressing the same in the axial direction and for thereby expanding its solid parts in radial directions so that these parts will press radially against the inner wall of the housing and against the ribs on the bearing bushing, whereby the latter will be deformed so as to form a plurality of separate bearing surfaces for the shaft which are separated by parts which do not engage with the shaft.

---

The present invention relates to a device for adjusting the bearing play of a journal bearing which comprises an adjusting bushing the radial dimensions of which may be varied by being compresed in its axial direction by tightening elements and which is provided with annular recesses alternating with each other in its outer and inner peripheral surfaces so that the intermediate solid parts between these outer and inner recesses form supporting rings which act similar to plate springs, and wherein the tightening elements which are equally spaced peripherally from each other extend in the axial direction through bores in the solid parts of the adjusting bushing.

It is an object of the present invention to provide an adjustable journal bearing of the type as described above which has a plurality of bearing or gliding surfaces for supporting a shaft which are equally spaced peripherally from each other. This object is attained according to the invention by providing a bearing bushing with a plurality of ribs which extend parallel to its axis at equal peripheral distances from each other and project from its outer peripheral surface. This bearing bushing is inserted into the adjusting bushing so that its ribs fully engage with the inner wall surfaces of the latter and are disposed substantially within the same radii in which the tightening elements of the adjusting bushing are located. When these tightening elements are tightened, especially the parts of the adjusting bushing which are located within the radial areas in which the tightening elements are located expand in radial directions. This expansion of the adjusting bushing is transmitted by the ribs to the bearing bushing which is thereby deformed so that the inner bearing or gliding surfaces of the bearing bushing for supporting the shaft are formed which are located substantially within the radii extending through the tightening elements and are moved more closely to the shaft than the other parts of these inner surfaecs. The invention therefore produces on the inner peripheral side a number of gliding or bearing surfaces for the shaft which corresponds to the number of tightening elements, while a radially widened part is formed on this bushing between each pair of adjacent gliding surfaces.

In order to insure that the adjusting bushing will be radially expanded primarily within the areas adjacent to the tightening elements, it is another feature of the invention to provide the adjusting bushing with peripheral slots in its outer wall surface between the spring-like supporting rings and extending radially through the outer wall between the adjacent tightening elements.

Another feature of the invention consists in providing simple locking means for maintaining the adjusting and bearing bushings in the same position in the peripheral direction relative to the bearing housing so that, after the bearing has once been properly adjusted so as to have the desired bearing play, the adjustment will not be affected by the rotation of the shaft.

Another feature of the invention consists in providing the bearing bushing with lubricating bores which are located in the areas between the adjacent ribs so as to permit an adequate supply of lubricant to be conducted to those areas of the inner wall of this bushing which are not in engagement with the shaft during its rotation and from which the lubricant then passes between the gliding surfaces of the bearing bushing and the shaft.

The invention further provides that at each end of the bearing bushing its ribs terminate into an annular flange which preferably has an outer diameter substantially equal to that of the ribbed parts and prevents the lubricant from flowing out of the bearing.

In combination with its other features the invention further provides the tightening elements to be in the form of screws which extend through the adjusting bushing and have a higher coefficient of thermal expansion than the material of the other parts of the bearing.

The features and advantages of the present invention will become further apparent from the following detailed description thereof which is to be read with reference to the accompanying diagrammatic drawings, in which—

FIG. 2 shows a cross section which is taken along the line II—II of FIG. 1 when the bearing is in its released position; while FIG. 3 shows a cross section similar to FIG. 2, but when the bearing is in its tightened position.

Figure 1:
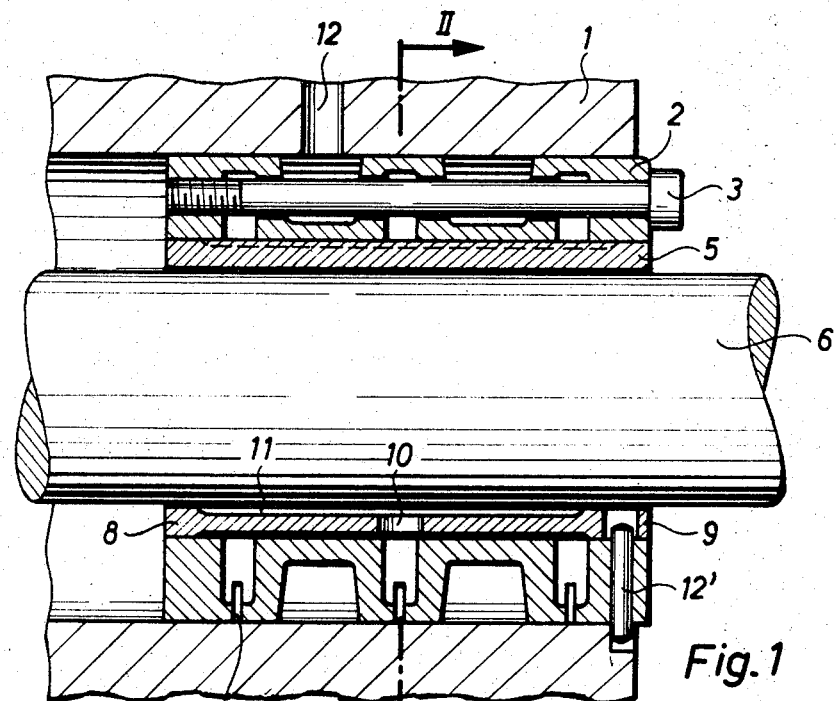
FIG. 1 shows a longitudinal section which is taken along the line I—I of FIG. 2.

As illustrated in the drawings, the invention comprises an adjusting bushing 2 which has a meander-shaped longitudinal section. This shape is attained by providing the bushing 2 with annular recesses which extend from the inner and outer sides into the bushing 2 and are offset relative to each other in the axial direction so that each part of the bushing which forms an outer wall surface is connected with an adjacent part forming an inner wall surface by a ring which functions similar to a plate spring. The adjusting bushing 2 is provided at the center of its wall thickness with four longitudinal bores which are equally spaced peripherally from each other and through which tightening screws 3 extend which are screwed into threads in one ring-shaped end of bushing 2 and the heads of which engage upon the other ring-shaped end of the bushing. As indicated in FIG. 1, screws 3 extend through the bores in the ring-like parts between the ends of bushing 2 with a small annular clearance. The peripheral outer surface parts of bushing 2 which are located between each pair of adjacent screws 3 and between the springlike rings are provided with slots 4 which extend in the peripheral direciton and permit the parts of the adjusting bushing 2 adjacent to the screws 3 to expand in radial directions when these screws are tightened.

Into the axial bore of the adjusting bushing 2 a bearing bushing 5 is inserted in which a shaft 6 is mounted with a small radial play. Bushing 5 is provided with longitudinal outer ribs 7 which are formed by intermediate recesses in the outer surface of this bushing and the centers of which are disposed in radial alignment with the axes of screws 3. The recesses between ribs 7 extend in the axial direction up to annular flanges 8 and 9 at the opposite ends of bushing 5 which have an outer diameter substantially equal to that of the ribbed parts 7. The recessed parts of bushing 5 between the ribbed parts 7 are provided with lubricating bores 10 which terminate into longitudinally extending lubricating grooves 11 in the inner wall surface of bushing 5.

The bearing housing 1 is provided with a lubricating bore 12 through which a lubricant may be supplied which may then pass through the gaps between screws 3 and the adjusting bushing 2 and through the recesses between the ribs 7 to the lubricating bores 10 and through the latter into the lubricating grooves 11 which extend up to the solid annular flanges 8 and 9 at the ends of bushing 5.

For always maintaining the two bushings 2 and 5 in the proper position relative to each other, a locking pin 12′ is inserted into a bore in the adjusting bushing 2 and its inner end extends into a bore in the bearing bushing 5, while its outer end projects into a recess in housing 1. Locking pin 12′ thus insures that at least in its released position the adjusting bushing 2 is prevented from shifting in one axial direction and that the parts of each bushing 2 which are located between the ribs 7 of bearing bushing 5 are disposed in proper radial alignment with each other.

Figures 2, 3:
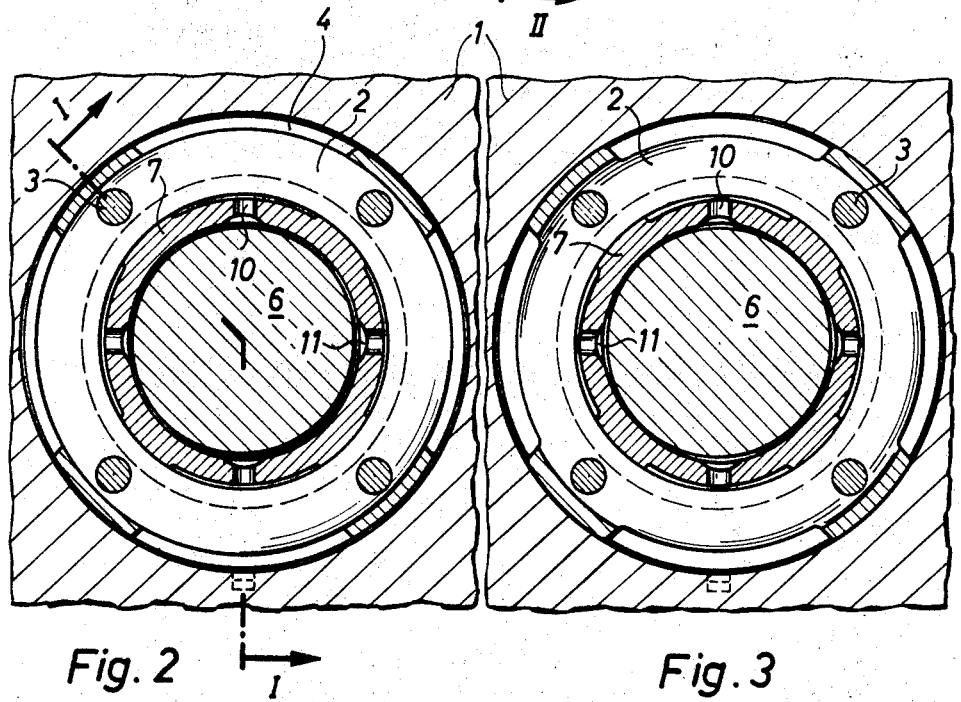

When the screws 3 are tightened, the parts of the adjusting bushing 2 which are adjacent to these screws expand in radial directions and, after engaging with the inner wall surface of housing 1 and with the ribs 7 of bushing 5, bushing 2 presses the ribs 7 inwardly in radial directions. Bushing 5 will thus be unequally deformed in the manner as illustrated in FIG. 3 so that its parts which are located radially within the area of screws 3 will be pressed inwardly so as to form gliding or bearing surfaces for the shaft 6, while the parts between these gliding surfaces will expand so that the lubricating grooves 11 will be enlarged to form lubricating pockets.

The device according to the invention has the further advantage that, if two bearings are located in the axial direction behind each other and are not in accurate alignment with each other, such errors in alignment may be corrected when mounting the bearings and the shaft by tightening some of the screws 3 more than others. Due to this possibility of adjusting the bearings relative to each other, it is now no longer necessary to fit the bearings properly by scraping them which was an expensive procedure which usually could not be avoided prior to this invention. The bearings according to the invention may therefore be very easily and quickly installed as well as removed without requiring them to be forced by pressure into or out of their housing.

Although the adjusting bushing as shown in FIG. 1 has two inner peripheral surfaces between its outer end rings, it may also be provided with only one inner surface or with more than two inner surfaces between these end rings.

Screws 3 are preferably expansible by being made of a material which has a higher coefficient of thermal expansion than the material of the other parts of the bearing. This has the advantage that, when the proper bearing play has once been adjusted, it will remain substantially the same even though the bearing changes in temperature.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A device for adjusting the bearing play between a shaft and a journal bearing mounted in a bearing housing, comprising a meander-shaped adjusting bushing having adjacent annular recesses in its outer and inner peripheral surfaces alternating with each other in the axial direction of said bushing and adapted to be inserted into said housing so as to engage with the inner wall thereof, the solid parts of said adjusting bushing intermediate the adjacent outer and inner recesses forming connecting rings functioning like plate springs, said adjusting bushing having a plurality of bores extending in its axial direction and equally spaced peripherally from each other, a tightening element extending through each of said bores, said tightening elements when tightened being adapted to reduce the length of said adjusting bushing and thereby to expand it in radial directions, and a bearing bushing inserted into said adjusting bushing and having ribs extending in said axial direction and projecting radially from the outer peripheral surface of said bearing bushing and being disposed within the radii extending from the axis of said shaft through the axes of said tightening elements and engaging upon the inner surface of said adjusting bushing.

2. A device as defined in claim 1, in which the outer peripheral wall of said adjusting bushing is provided with peripheral slots between said springlike connnecting rings and extending radially through said wall between the adjacent tightening elements.

3. A device as defined in claim 1, further comprising locking means for maintaining said two bushings in a fixed position in a peripheral direction relative to each other and relative to said housing.

4. A device as defined in claim 3, in which one end of said adjusting bushing has a substantially radial bore and the corresponding end of said bearing housing and of said bearing bushing each having a recess, said locking means comprising a locking pin in said bore and engaging into said recesses.

5. A device as defined in claim 1, in which said bearing bushing has substantially radial lubricating bores in the parts thereof intermediate said ribs.

6. A device as defined in claim 5, in which the inner side of said bearing bushing is provided with lubricating grooves extending in the axial direction of said bushing and terminating at a certain distance from both ends of said bushing.

7. A device as defined in claim 5, in which each of said ends of said bearing bushing forms an annular flange having an outer diameter substantially equal to that of the parts of said bushing forming said ribs and peripherally connecting the adjacent ends of said ribs.

8. A device as defined in claim 1, in which said tightening elements consists of screws made of a material having a higher coefficient of thermal expansion than the other parts of said journal bearing.

References Cited

FOREIGN PATENTS 716,779    1/1942    Germany.

FRED C. MATTERN, Jr., Primary Examiner

F. SUSKO, Assistant Examiner

U.S. Cl. X.R.

308—122, 240